United States Patent [19]

White et al.

[11] Patent Number: 4,602,365
[45] Date of Patent: Jul. 22, 1986

[54] MULTI-TOKEN, MULTI-CHANNEL SINGLE BUS NETWORK

[75] Inventors: Robert J. White, Holliston; Ross E. Roberts, Shrewsbury, both of Mass.

[73] Assignee: Prime Computer, Inc., Natick, Mass.

[21] Appl. No.: 579,096

[22] Filed: Feb. 10, 1984

[51] Int. Cl.⁴ .......................... H04J 3/00; H04J 3/16; H04J 1/00; H04J 3/02
[52] U.S. Cl. ........................................ 370/89; 370/86; 370/88; 370/124; 370/85; 340/825.05; 340/825.5
[58] Field of Search ..................... 370/50, 89, 88, 124, 370/86, 112, 85, 37, 112; 340/825.05, 825.5, 825.51

[56] References Cited

U.S. PATENT DOCUMENTS

| | | | |
|---|---|---|---|
| 3,787,627 | 1/1974 | Abramson et al. | 179/15 BA |
| 3,863,220 | 1/1975 | Osawa et al. | 340/147 LP |
| 3,985,962 | 10/1976 | Jones et al. | 179/15 AL |
| 4,019,176 | 4/1977 | Cour et al. | 340/172.5 |
| 4,078,228 | 3/1978 | Miyazaki | 370/86 |
| 4,101,734 | 7/1978 | Dao | 370/119 |
| 4,237,553 | 12/1980 | Larsen | 370/89 |
| 4,287,592 | 9/1981 | Paulish et al. | 370/88 |
| 4,295,122 | 10/1981 | Hatada et al. | 340/147 LP |
| 4,320,502 | 3/1982 | deVeer | 370/85 |
| 4,324,000 | 4/1982 | Ali | 370/85 |
| 4,439,856 | 3/1984 | Ulug | 370/94 |

Primary Examiner—Douglas W. Olms
Assistant Examiner—Wellington Chin
Attorney, Agent, or Firm—Lahive & Cockfield

[57] ABSTRACT

A token-passing ring network, having a plurality of nodes connected to a bus loop, employs multiplexing circuitry for connecting each node to the bus on at least one of a plurality of simultaneously operating bus channels. Each bus channel operates independently of each other bus channel and each channel has associated therewith, its own token. The multiple channels are arranged on a single transmission medium and an amplitude multiplexing receiver and transmitter circuitry provide the plurality of channels on the medium.

8 Claims, 6 Drawing Figures

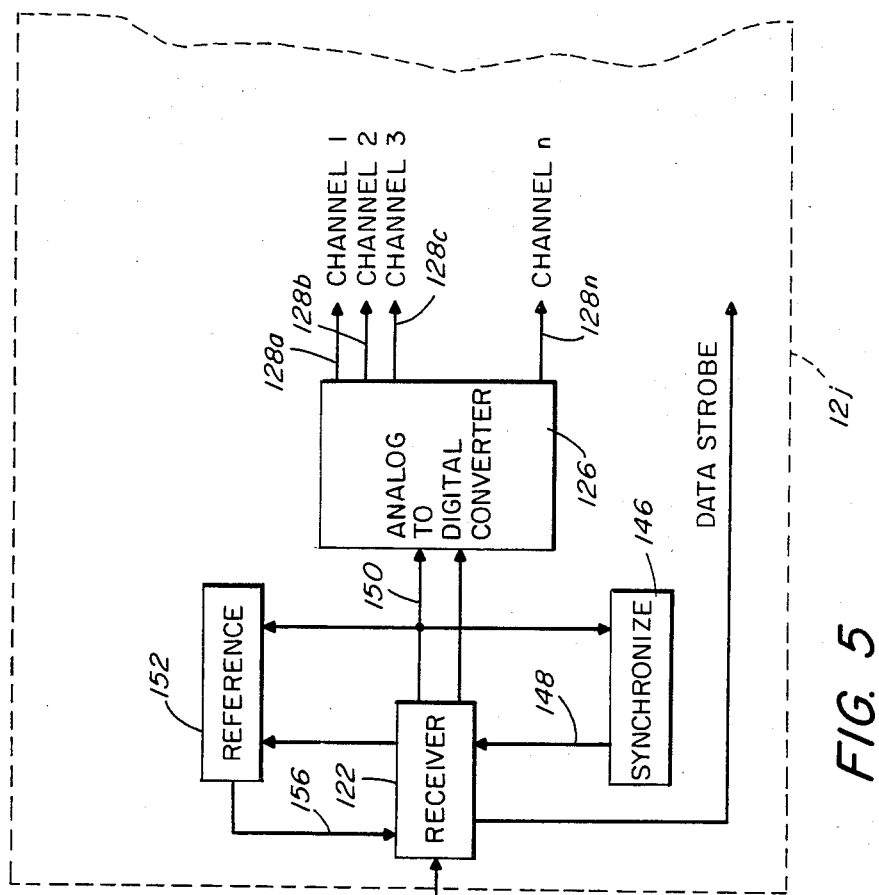
*FIG. 5*
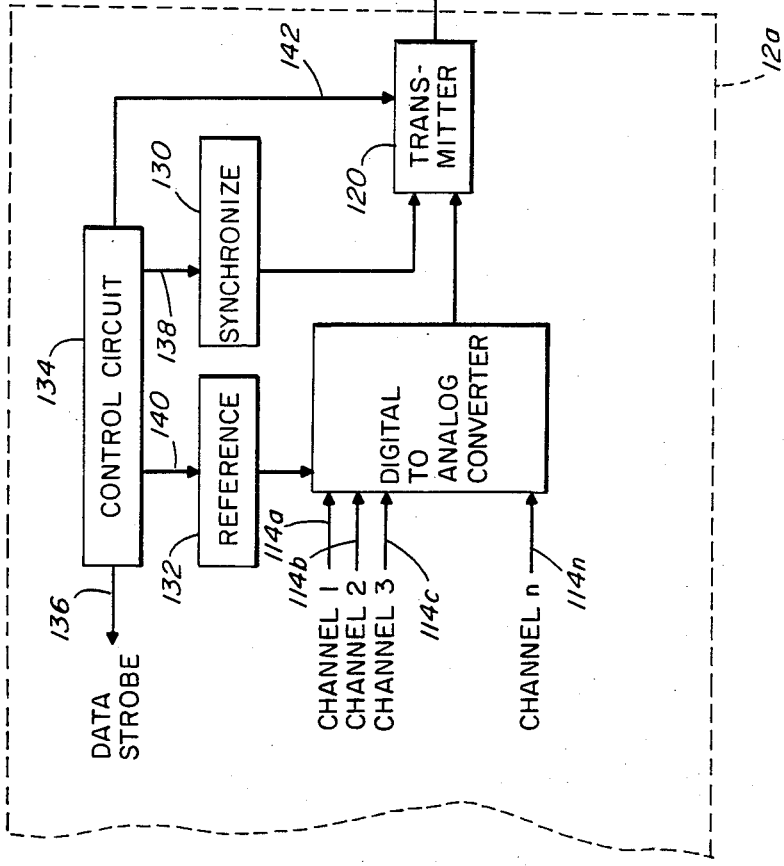
*FIG. 6*
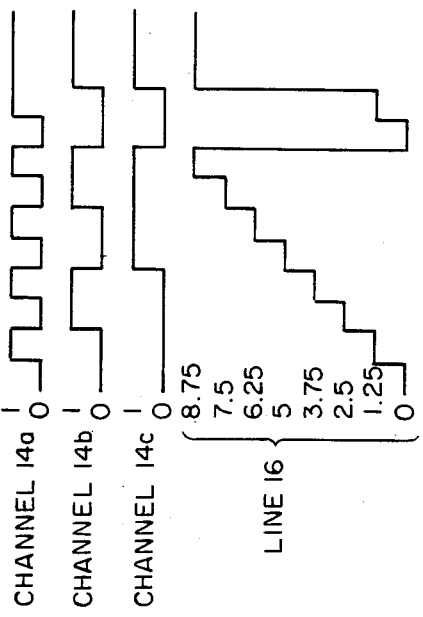

MULTI-TOKEN, MULTI-CHANNEL SINGLE BUS NETWORK

BACKGROUND OF THE INVENTION

The invention relates generally to data communications systems and in particular to a method and apparatus for operating a token passing ring network.

Token passing ring networks are commonly used for computer or data processing communications. They typically operate at very high data rates; and to use the network, a station or node must possess the "token" which enables the node to transmit data.

Perhaps the most serious deficiency of the token passing ring network is network latency; that is, if many or all nodes of the network require access to the network, then each user must wait a much longer time than if the network were idle. This corresponds to the relatively slow "passing" of the token from user to user. Several methods have been employed for reducing the latency time. For example, an increase of bandwidth on the network bus (and the cost attendant therewith) allows a higher data rate to be employed along the bus thereby reducing the "transit time" around the bus. As noted above, however, increasing the bandwidth of the bus is an expensive approach to solving the latency problem and may require the bus to have substantial excess capacity during the normal, non-peak, use times.

Other systems have employed a time division multiplex whereby one or more nodes is allotted a specific time slot according to the repeating repetition rate of the system. This reduces the rate of transmission for each individual transmitting node and if all nodes are transmitting onto the line, does little to reduce the network latency.

It is therefore an object of the invention to reduce network latency in token passing ring networks while maintaining reasonable manufacturing costs and high reliability. Another object of the invention is reducing network latency in existing ring networks.

SUMMARY OF THE INVENTION

The invention relates to a token-passing ring network apparatus and method. The network has a plurality of nodes connected thereto and each node has a multiplexing circuit for communicating between the node to the network bus. The invention features a multiplexing circuit for connecting the node to the bus on at least one of a plurality of simultaneously operating parallel channels of the bus, each channel operating independently of each other channel and each channel having its own token.

In preferred embodiments of the invention, the multiplexing circuitry can be either an amplitude or a frequency multiplexing system and the channels can be assigned a priority in accordance with the operation of the channel or the function to which the channel will be put.

In another aspect of the invention, the method features the steps of simultaneously operating a plurality of independent token passing data channels on a ring network bus loop and connecting each node to the network bus for communicating along at least one of the channels.

In a particular embodiment, the method features establishing a priority structure for the channels. Multiple channel operation can be established in a single medium by using frequency or amplitude multiplexing and provides access to each of said plurality of channels. In a further aspect of the preferred embodiment of the invention, each channel or a plurality of channels can be dedicated to a specific function, for example, one channel can be dedicated to performing diagnostics.

BRIEF DESCRIPTION OF THE DRAWINGS

Other objects, features, and advantages of the invention will be apparent from the following description of a particular embodiment taken together with the drawings in which:

FIG. 5 is a more detailed block diagram of the amplitude multiplexing apparatus employing synchronization and reference signal circuitry; and FIG. 6 is a timing diagram of various electrical signals at the transmitting element.

DESCRIPTION OF PARTICULAR EMBODIMENTS

Figure 1:
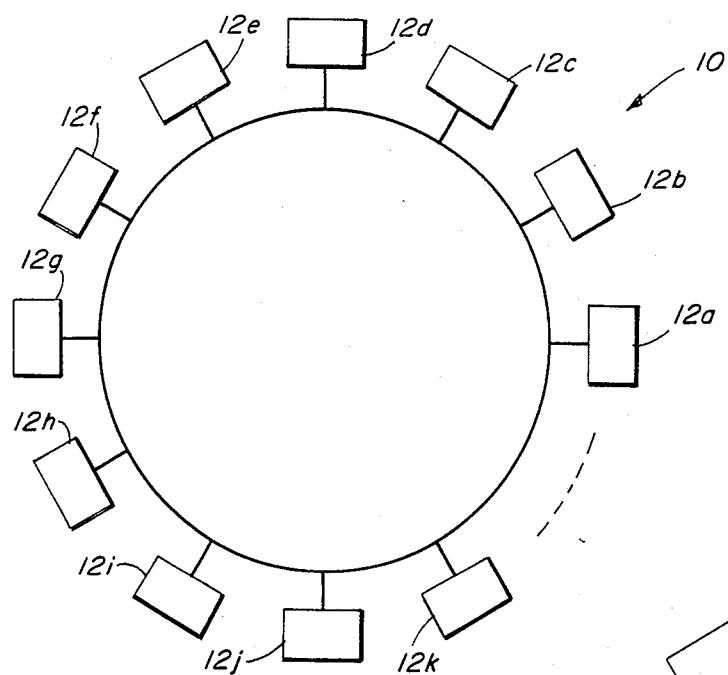
FIG. 1 is a schematic representation of a token-passing, ring network according to the invention.

Referring to FIG. 1, a ring network 10 has a plurality of nodes $12a$, $12b$, ..., $12k$ connected thereto. Each node represents an operating station or user which can communicate with other operating stations or users, that is, other nodes, connected to the ring. The nodes can connect to or can leave the ring as desired.

The ring network 12 operates according to the well known token-passing mode of operation. That is, before a node can transmit data onto the ring network, it must have in its possession a "token" as that term is commonly used in the art. The art of token passing ring networks is well developed and various priorities of use, as well as token regeneration methods, can be implemented in connection with the ring network. Typically, the nodes connect to a single medium, for example a cable 14, which provides the physical connection between the various data communications nodes. The cable 14 is typically, for example, a coaxial cable, having specified bandwidth and other well-known operating parameters.

Figure 2:
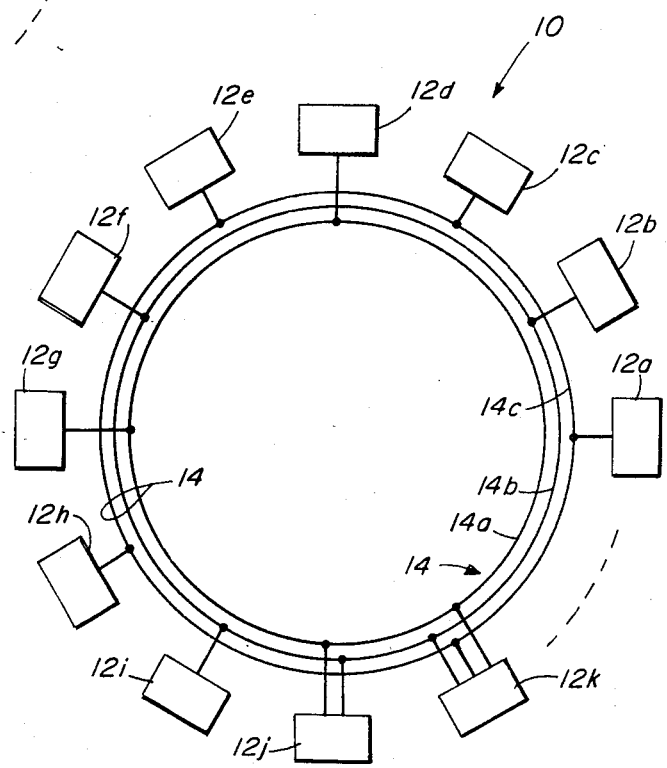
FIG. 2 is a conceptional illustration of a multitoken, multi-ring network according to the invention.

Referring to FIG. 2, according to the invention, the ring network is viewed conceptually as having a plurality of simultaneously operating parallel channels $14a$, $14b$, ..., $14c$. Each of the channels can be constructed as a separate channel transmission medium, for example a separate cable; however this entails, for existing systems, the difficulty and complexity of major and costly redesign and for new systems expensive and unnecessary additional costs. The invention therefore contemplates using a single medium, such as cable 14, as is typical in tokenpassing ring networks, and employing a "parallel" type multiplexing circuitry, for example, frequency or amplitude multiplexing, to effectively divide the single medium into a plurality of simultaneously operating data channels. The individual channels can operate substantially independently of one another and, according to the preferred embodiment of the invention, each individual channel has its own asynchronous token associated therewith. That is, the tokens need not be aligned in time. The nodes 12a, 12b, ..., 12k communicate with and operate over one or more of the channels. For example, illustrated node 12a operates over channel 14c; node 12b operates over channel 14b, node 12j operates over channels 14a and 14b, and node 12k operates over all of the illustrated channels 14a, 14b, and 14c.

Figure 3:
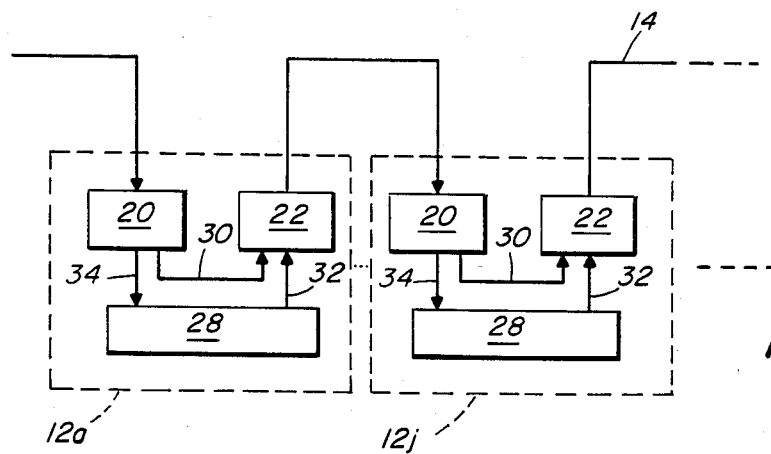
FIG. 3 is a block diagram of a particular embodiment of the node connection to the network in accordance with the invention.

Referring now to FIG. 3, in one preferred embodiment of the invention, each node 12 when connected to the network, is connected in series with the cable 14. Each node has at least one multiplexing receiving element 20 and at least one multiplexing transmitting element 22 connecting to the ring bus, cable 14. Most generally, the receiving and transmitting multiplexors 20, 22, can operate to receive data from any channel and to transmit data onto any channel. Practical considerations will dictate, however, the channels which the multiplexors will address. In the illustrated embodiment of FIG. 3, the illustrated multiplexing receivers 20 and multiplexing transmitters 22 are associated with, respectively, nodes 12a and 12j. Node 12a operates to receive and transmit data only over channel 14c; however, node 12j can operate, for example, to receive data from channel 14a and transmit, simultaneously if desired, data over channels 14a and 14b. In other embodiments of the invention, the transmitter and receiver can, transmit and receive on the same or a plurality of different channels. Thus in accordance with the invention, and independent of the multiplexing system employed, a user station 28 can transmit to and receive from, simultaneously if desired, two or more channels of the ring bus.

The construction and operation of a particular multiplexor will also depend upon the particular parallel multiplexing method being employed. If, for example, frequency muliplexing were employed, each receiving multiplexor 20 would provide channel data signals to the user station 28 and provide the "unaltered" channel signals over line 30 to the transmitting multiplexor. The signals on line 30 would be combined with user generated data, if any, over lines 32, to transmit to the network.

Preferably, the multiplexing elements 20, 22 operate in accordance with an amplitude multiplexing method and structure such as that described in U.S. Ser. No. 466,075, filed Feb. 14, 1983, entitled "Method and Apparatus for Transmission of Digital Data Signals by Amplitude Multiplexing", assigned to the common assignee of this patent application. Amplitude multiplexing generally requires less bandwidth, and has a lower hardware cost than does frequency multiplexing.

In accordance with the amplitude multiplexing method, all incoming data must be demultiplexed by multiplexing receiver 20. The unused data is provided directly to the transmitting multiplexor over lines 30, and the user data is available to user station 28 over lines 34. In accordance with this aspect of the invention, the transmitting multiplexor 22 would then retransmit the incoming demultiplexed signal, either unmodified, if no information were being added to the channels, or modified if data information over line 32 were being generated for one or more channels by the user station.

Thus, in its most general form, the multiplexing transmitter and receiver provide the user, through control element 28, with the capability of transmitting over and receiving from any of the multiplexed channels on the bus. In accordance with this aspect of the invention, the multiplexors can each be viewed as a multi-position switch controlled by the control element 28 for connecting to any of the channels of the bus. Control element 28 operates the multiplexing receiver 20 to receive data information from any channel or channels, and to provide the received data to control element 28. The transmitting multiplexing element 22, under the control of the control element 28, then receives data from the user through control element 28, and, as determined by the control element 28, transmits that data on the appropriate multiplexed channel or channels.

Figure 4:
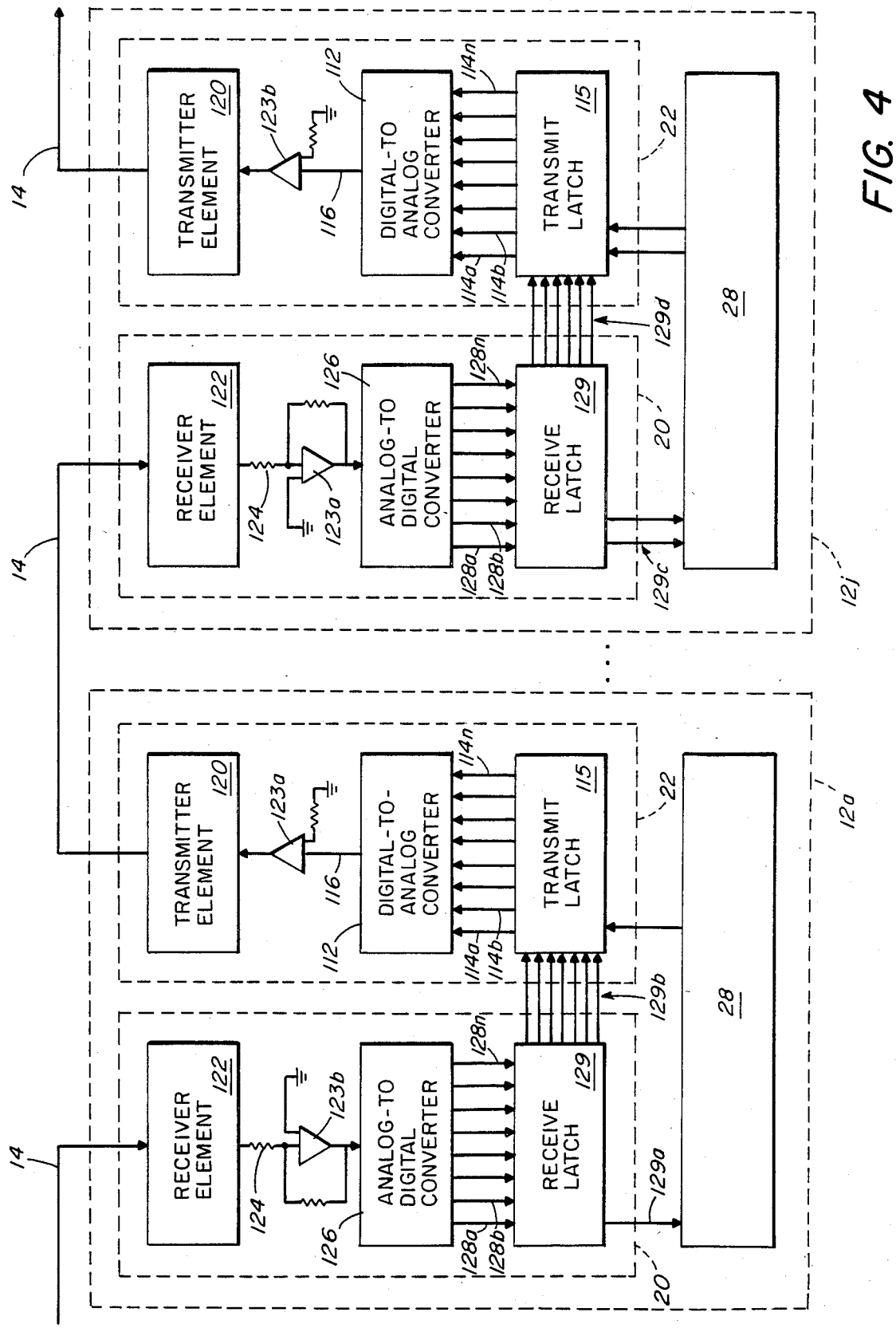
FIG. 4 is a block diagram of a preferred embodiment of an amplitude multiplexing apparatus.

Referring to FIG. 4, each transmitter 22 and receiver 20 preferably employ the amplitude multiplexing technique as follows. The amplitude multiplexing system receives, at the transmitter 22, a plurality of inputs, n, one input for each channel. The transmitter has a latch 115 for receiving and storing the data input signals. The latch 115 supplies the data to a digital to analog (D to A) converter 112. In the illustrated embodiment of the invention, each of the input lines 114 to the D to A converter represents a separate digital channel available on cable 14, the channels preferably being synchronized when read from data latch 115, to provide stable digital inputs to the digital to analog converter. Thus, each of the "n" input channels corresponds to a digital input on the corresponding input line $114a$, $114b$, ... $114n$. Correspondingly, the digital to analog converter 112 is an n-bit converter having an analog output signal over a line 116. The analog output signal has one of a plurality of discrete output levels defined by the n-bit "word" input to the converter 112. As the inputs change from time to time, the analog output signal over line 116 will correspondingly change from one of the discrete output levels of the digital to analog converter to another of its output levels.

The analog output signal on line 116 is directed along a transmission path, for example cable 14, by an analog transmitter element 120 and is received by an analog receiver element 122. Buffer amplifiers $123a$ and $123b$ buffer the analog signals to and from the transmitter and receiver elements respectively. In other embodiments of the invention, other transmission paths and transmitting/receiving apparatus can be employed. For example, the transmission path can be an optical cable or another relatively noise-free communications media.

The analog signal is received by analog receiver element 122 whose output, over a line 124 is an analog electrical signal. In the absence of noise or loss in the transmission path, the signal over line 124 is an identical replica, somewhat delayed by the transmission path, of the analog signal on line 116. An analog to digital converter 126 receives the analog electrical signal over line 124 (as buffered by amplifier $123b$) and provides a multi-bit digital output over lines $128a$, $128b$, ..., $128n$. The output signals over lines 128 correspond to the digital input signals over lines 114. Thus, the signal amplitude transmitted over the transmission path is an amplitude multiplexed signal, the signal amplitude representing at any one time, the digital data on a plurality of input channels. The outputs 128 of converter 126 are applied to a latch 129 for storage during a clock period.

The outputs of the receiver latch 129 include all of the data inputs over lines 128. A portion $129a$ of those lines, are supplied to the control element 28 while the remainder $129b$ of those lines are provided directly to the transmit latch 115. In the illustrated embodiment of FIG. 4, the node 12a receives one channel of data and provides the same channel of data to the transmit latch for combination with the unmodified data provided from the receive latch 129. In accordance with the illustrated embodiment, however, more than one channel can be employed at a node; and accordingly, illustrated node 12j receives two data channels over lines 129c and supplies to the transmit latch 115, two data channels to be combined with the remaining unmodified channels over lines 129d. Thus, node 12j can receive data from one channel and can transmit over a second channel. In this instance, however, the control element 28 must appropriately format and acknowledge receipt of the data and must also ensure that it has possession of the token for the channel(s) on which it will transmit.

If the bandwidth of the analog transmission path is limited, a plurality of digital channels (for example eight, in the illustrated embodiment), each operating at the same effective bandwidth, can still be transmitted over the transmission path by providing a plurality of different amplitudes for the analog signal thereon. This allows an increased data rate (ignoring noise which is discussed below) through the transmission path amd importantly provides for a simple and inexpensive apparatus and method for converting a plurality of input channels to a uniquely decodable amplitude modulated analog output signal which can be transmitted over a single medium.

It has been assumed, as noted above, that the transmission path is both noise-free and loss-free. In an actual operating system, neither of these assumptions need hold true. The effect of noise is to limit the number of discrete levels available for transmission over transmission path. Thus, the received analog signal at the output of receiver element 122 must be capable of being uniquely and unambiguously decoded by the analog to digital converter 126. Otherwise, errors in the output signal will occur. By limiting the number of discrete levels in the output of digital to analog converter 112, the noise can be accounted for. For example, when eight channels of digital information are employed there will be 256 discrete output levels from converter 112. Assuming for example a ten volt full scale output, this corresponds to approximately forty millivolts separation per channel. Thus, the peak noise amplitude level should generally be less than twenty millivolts for reliable communication. However, those practiced in the art will realize that for some embodiments, the analog to digital converter 126 inherently acts like a low pass filter because of a time integration performed in the sample and hold circuit of the converter. Thus, depending upon the integration time, greater peak noise levels may be allowable; and it is well known to those practiced in the art to calculate the probabilities of error given the parameters of this system. Other analog to digital converters, those which use a successive approximation implementation do not have this feature but can be used.

Just as important, fixed and/or time varying signal attenuation in the transmission path can seriously affect operation of the apparatus. Therefore, further circuitry is employed to maintain reliable operation where the characteristics of the transmission path are not known in advance or where the transmission path can vary in its operating characteristics. Referring now to FIG. 5, which illustrates an alternate embodiment of a portion of nodes 12a and 12j, the analog transmitting circuitry 120 is further provided with a synchronization circuit 130 and a reference signal circuit 132. Thus, in accordance with this embodiment of the invention, the receiver periodically provides, in response to the synchronization circuit 130 and a control circuit 134, a uniquely identifiable signal over the transmission path, the synchronization signal. Thus, for example, the synchronization signal can be either a uniquely shaped pulse, a unique combination of pulses which occur at no other time, or a pulse having an amplitude greater than the maximum amplitude otherwise available from the D/A converter 112.

The control circuit 134 includes a clock and provides a data strobe over a line 136 for strobing data to converter 112 from for example a buffer latch (not shown) corresponding to latch 115 of FIG. 4. The control circuit also has a reference output over a line 138, a synchronization output over a line 140, and a transmitter source control output over a line 142. In response to one signal level over line 142, the transmitter takes its output from the synchronization circuit and in response to a second level, over line 142, the transmitter takes its output from the D/A converter 112. Thus control circuit 134 periodically switches the transmitter 120 to take its input from the synchronization circuit. That synchronizing input in this illustrated embodiment is an analog signal having an amplitude greater than that allowed by the D/A converter.

The control circuit 134 further periodically provides signal levels over line 140 for effecting a full amplitude output from the D/A converter. The reference circuit in response to the activating reference signal level on line 140, places signals on line 144 which form a full amplitude output from D/A converter 112.

The receiving station employs a receiver synchronizing circuit 146 for generating a synchronization pulse train over a line 148 to the receiver element 122 to aid in and improve upon the accuracy and reception of the received signal. In this illustrated embodiment, the synchronizing circuitry recognizes the transmitter synchronization signal at data output 150 of receiver 122 and provides in response thereto, synchronization data over line 148.

Furthermore, the receiving station circuitry further has a reference generating circuitry 152 for normalizing the data output of receiver element 122. Reference generating circuitry 152 monitors the analog data output and, in response to receiving circuitry 122, provides the necessary control data over a line 156 for adjusting the receiver gain to provide a normalized analog output signal over line 150. A "normalized analog output signal" is a signal over line 150 which produces an output from the A/D converter 126 which is the same as the input to the D/A converter 112 which produced that signal. Preferably the reference level is transmitted at least at the beginning of a data transmission. In some applications, the reference level can be periodically transmitted after each block of data, a block of data having a fixed number of bits.

Referring to FIG. 6, a typical three channel, three input line digital to analog converter has eight output levels. (Channel 1 is the most significant bit, channel 2 the next most significant bit; and channel 3 the least significant bit.) As the input channel levels change, correspondingly, the analog output signal over line 116 also changes. The digital to analog converter used in connection with FIG. 6 could be for example the multibit converter of FIG. 4 wherein only the three most significant bits are employed. This may be necessary, for example, in those instances where the noise level on the transmission path is high and does not allow the full capabilities of the analog to digital converter to be employed.

As described in connection with the above-identified White application, a single multiplexing element, using amplitude multiplexing, can connect to the bus and provide at its output a plurality of data communication signals, one output related to each of the channel signals on the bus. The control element 28 can then take one or more of these data signals for processing and use. In particular, the control element 28 can receive along one channel and transmit along a second channel. This feature of the invention provides for what can be termed "channel hopping", where the control element 28 can dominate on one channel of the ring. Thereby, it is possible to transmit larger packets of information without unduly delaying transmission of data from other waiting nodes.

The operation of a particular channel of the ring network is comparable to the operation of a typical, one channel token-passing ring network. Each channel according to the invention has its own token, the tokens being asynchronous from each other. Furthermore, the use of amplitude multiplexing can increase the total data rate along the medium.

According to a preferred embodiment of the invention, the channels into which the bus can be divided can be dedicated to specified uses. For example, a first channel can be used solely for communications between CPU's while a second channel can be used solely for the retrieval and storage of information on disk or other archival storage media such as optical memory. A third channel can be employed and dedicated to diagnostics and a fourth channel can be employed for another specific network requirement. In addition, if a node is "busy" on one ring channel of the network, an incoming message can be made available or received on another available ring channel.

The data rates available on each channel can also vary. Thus, when frequency multiplexing is employed, the channels defined by different frequencies need not have the same bandwidth and data rate.

Additions, subtractions, deletions, and other modifications of the disclosed embodiments of the invention will be apparent to those practiced in the art and are within the scope of the following claims.

What is claimed is:

1. In a token-passing ring network having a plurality of nodes connected to a single conductor bus loop, the improvement comprising, at each node, a multiplexing means for connecting said node to said bus, said multiplexing means receiving from and transmitting to said bus on at least one of a plurality of channels, said channels operating simultaneously in parallel over said bus, each channel operating independently of each other channel and each channel having its own token.

2. The ring network of claim 1 wherein said multiplexing means comprises an amplitude multiplexing receiver means for receiving signals on said bus loop and for providing therefrom, signals on said plurality of channels, and an amplitude multiplexing transmitter means for amplitude multiplexing data signals on said channels for generating amplitude multiplexed signal for transmission on said bus loop.

3. A data communications method for multiplexing data transmission on a token-passing ring network having a plurality of nodes, the net-work having a single conductor bus loop, comprising the steps of simultaneously operating a plurality of parallel, independent, token-passing data channels on said network bus loop, and connecting each node of said network for receiving data from and transmitting data to at least one of said channels on said network bus loop.

4. The method of claim 3 further comprising the step of multiplexing, on a single medium using an amplitude multiplexing method, for providing said plurality of channels.

5. The method of claim 4 further comprising the step of establishing a priority structure for said channels.

6. The method of claim 4 further wherein said multiplexing step comprises at each node, the steps of receiving signals on the bus loop and generating therefrom digital signals for each said channel, generating an amplitude muliplexed transmitter signal and placing said signal on said channel, and maintaining each said channel as an independently operating, token-passing communications channel.

7. The method of claim 3 further comprising the step of connecting at least one node of said network for data communications with at least two said channels.

8. A data communications method for multiplexing data transmission on a token-passing ring network having a plurality of nodes, the network having a single conductor bus loop, comprising the steps of multiplexing data signals on the bus loop using an amplitude multiplexing method, for providing a plurality of independent token-passing data channels for said network, connecting each node of said network for communicating with at least one of said channels, establishing a priority structure for said channels, receiving signals on the bus loop at each node and generating therefrom at the node digital signals for each channel, generating an amplitude multiplexed transmitter signal at each node and placing said signal on a said channel, and maintaining each said channel as an independently operating token-passing communications channel.

* * * * *